United States Patent [19]

Carson

[11] 4,121,977
[45] Oct. 24, 1978

[54] POWER GENERATION AND POTABLE WATER RECOVERY FROM SALINOUS WATER

[75] Inventor: Don B. Carson, Mt. Prospect, Ill.

[73] Assignee: UOP Inc., Des Plaines, Ill.

[21] Appl. No.: 751,427

[22] Filed: Dec. 16, 1976

[51] Int. Cl.$^2$ .............................................. B01D 3/06
[52] U.S. Cl. ...................................... 203/11; 203/22; 203/DIG. 1; 203/DIG. 16; 203/DIG. 20; 202/173; 202/180; 60/648; 60/641
[58] Field of Search .............. 203/11, 22, 73, DIG. 1, 203/DIG. 88, DIG. 20, DIG. 100, DIG. 17, DIG. 16; 202/173, 174, 234, 180; 159/15, 16, 24 A; 60/641, 648

[56] References Cited

U.S. PATENT DOCUMENTS

| | | | |
|---|---|---|---|
| 2,006,985 | 7/1935 | Claude et al. | 203/10 |
| 3,511,756 | 5/1970 | Guerrieri | 202/173 |
| 3,908,381 | 9/1975 | Barber et al. | 60/641 |
| 3,928,145 | 12/1975 | Othmer | 203/DIG. 1 |

*Primary Examiner*—Wilbur L. Bascomb, Jr.
*Attorney, Agent, or Firm*—James R. Hoatson, Jr.; Robert W. Erickson; William H. Page, II

[57] ABSTRACT

A process for simultaneously generating power and recovering potable water from a source of salinous water — e.g. sea water. Salinous water, from a locus which is proximate to the surface thereof and at a relatively high temperature — e.g. about 85° F. — is increased in temperature via indirect contact with a vaporous phase, derived from the surface water at an elevated temperature and a subatmospheric pressure. The preheated salinous water is exposed to radiant solar energy, in a solar radiation heat sink, to further increase the temperature thereof. Thus-heated salinous water is introduced into a first flash separation zone, maintained at subatmospheric pressure, to provide a first substantially non-salinous vaporous phase and a first salinous liquid phase. The first vaporous phase is passed into and through a turbine, from the resulting motion of which power is generated. The first liquid phase is introduced into a second flash separation zone, maintained at a lower absolute pressure than said first flash zone, to provide a second salinous liquid phase and a second substantially non-salinous vaporous phase. The latter is utilized to preheat the salinous surface water prior to the introduction thereof into the solar radiation heat sink. The second liquid phase is introduced into a third flash separation zone, maintained at a lower absolute pressure than said second flash zone, to provide a third salinous liquid phase and a third substantially non-salinous vaporous phase. Vapors exiting from the turbine and the third vaporous phase are cooled and/or condensed via indirect contact with a second portion of the salinous water, obtained from a locus substantially lower than the surface, and at a comparatively lower temperature — e.g. about 70° F. — to recover liquid potable water.

The third salinous liquid phase is returned to the original source of the salinous water, as is the second salinous water portion following its use to condense and/or cool the turbine exit vapors and the third vaporous phase. When returned to the salinous water source, the third salinous liquid phase is preferably at a temperature not more than 15° F. greater than the temperature of the second salinous water portion obtained at the selected depth below the surface.

10 Claims, 3 Drawing Figures

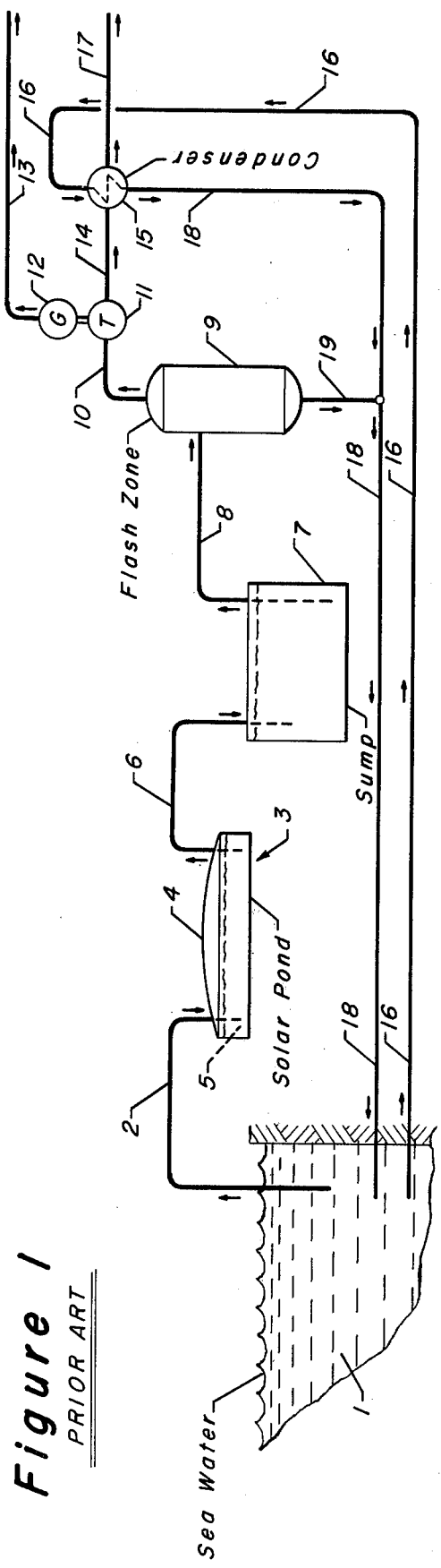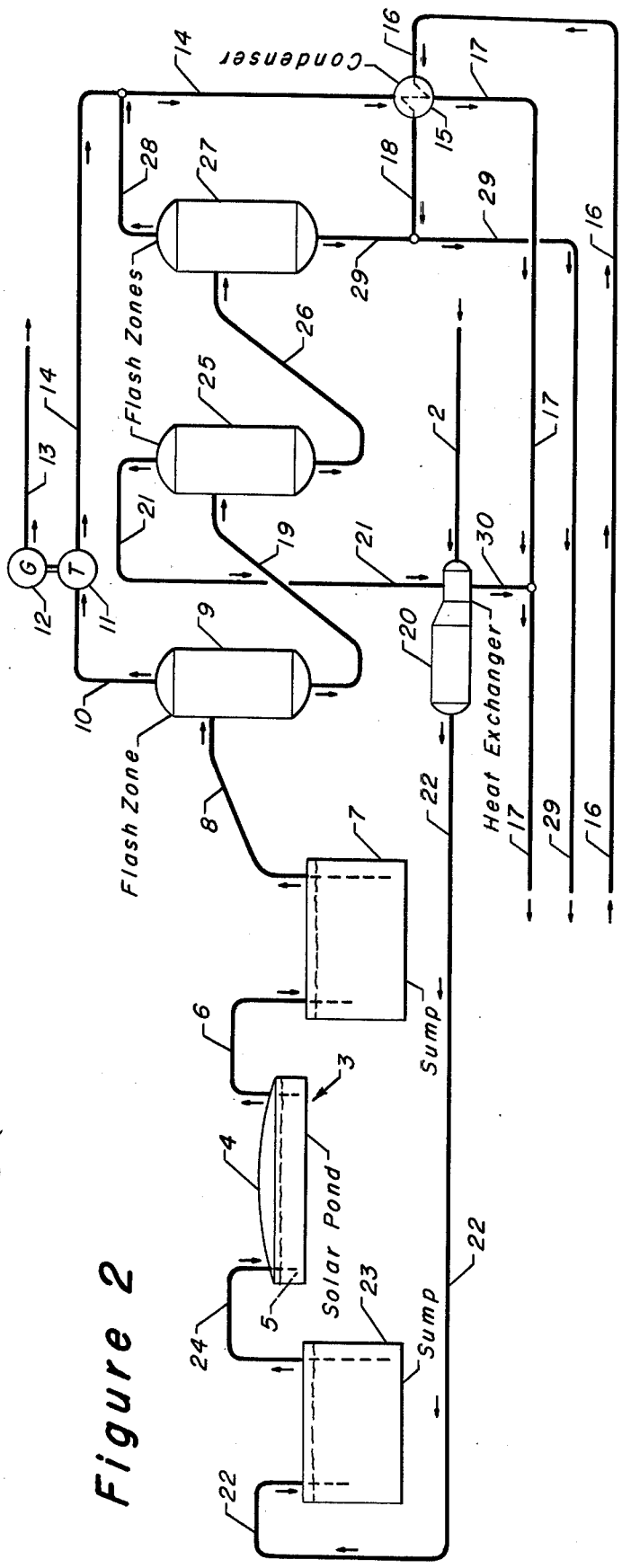

POWER GENERATION AND POTABLE WATER RECOVERY FROM SALINOUS WATER

APPLICABILITY OF INVENTION

According to many knowledgeable scientific experts, the world is currently entering into a period of time which future historians may well refer to as the "energy shortage" age. Whether considering (1) the availability of natural gas, (2) the sufficiency of oil reserves, or (3) untapped sources of coal, the consensus appears to indicate that a severe energy crisis is, or will soon be an established fact. One consequence, of course, is that a corresponding shortage of electrical power can be foreseen; that is, it will no longer be practical to convert one or more of these energy sources into electrical power. To alleviate this situation, consideration is currently being given to ocean thermal energy conversion, utilizing existing thermal gradients. The basic concept, first proposed by a French physicist as early as 1881, involves operating a heat engine, using warm surface water as the heat source, and cold water, from the ocean depths, as the heat sink.

In a similar vein, many areas of the world, especially those which are arid, face a critical shortage of potable water, both for human consumption and irrigation. Although sparsely located throughout the world, such areas abound particularly in the Middle Eastern countries and in the Northern desert regions of Africa. Coincidentally, many of these countries, or localized areas thereof, either border upon, or are readily accessible to sea and/or ocean waters. The process encompassed by my inventive concept, although not limited to such areas, is primarily applicable thereto. Exemplary of such an area is Saudi Arabia, the Western coast of which borders upon the Red Sea.

The invention herein described is directed toward a technique for simultaneously generating power and recovering potable water from otherwise impotable water. Although applicable to the processing of many types of brackish water and/or water having a high degree of salinity, the inventive concept is principally directed toward the generation of power and the recovery of potable water from sea water.

Briefly, the present invention involves the use of a combination of available ocean thermal energy and the natural solar energy supply. Initially, a first salinous sea water portion, obtained from a depth proximate to the surface, is increased in temperature by way of indirect heat-exchange with a vaporous phase which is obtained, at an elevated temperature and subatmospheric pressure, from the surface sea water. Following this initial preheat, the salinous water portion is introduced into a solar radiation heat sink, wherein it is exposed to radiant solar energy. The temperature is increased considerably, and the salinous water is introduced into a plurality of vacuum flash separation zones. Salinous liquid phases pass through the plurality of vacuum flash zones in series. Of the resulting substantially non-salinous vaporous phases, at least one is passed through a turbine, from the resulting motion of which power is generated; when more than one flash zone is utilized in the power flash section, each resulting vaporous phase passes through a separate turbine, or through a different stage of a multiple-stage turbine. The vaporous phase from at least one other flash zone is employed as the heat-exchange medium to preheat the salinous surface water prior to introducing the same into the solar radiation heat sink as above set forth; the liquid phase from this preheat system is subjected to a final flash separation in order to recover additional potable water. The turbine exit vapors, the vaporous phase employed to preheat the salinous surface water and the last-mentioned vaporous phase are cooled and/or condensed via indirect heat-exchange with a second salinous sea water portion, obtained from a depth substantially below the surface of the sea, to recover liquid potable water.

The final salinous liquid phase is returned to the sea water source. As hereinafter discussed in greater detail, a most important variable constitutes the temperature to which the surface water is increased within the solar radiation heat sink. Also of major importance is the temperature differential between the surface water and colder water selected from some finite depth below the surface. Regardless of the temperature of the salinous water charged to the initial flash separation zone, judicious operating techniques require the utilization of virtually all the resulting temperature differential with respect to the water obtained at the selected depth below the surface. To illustrate, where (1) surface water is available at about 85° F. (29.4° C.), (2) colder, deeper water is obtainable at about 65° F., (18.3° C.), or a temperature differential of 20° F. (11.1° C.), and, (3) the surface water is increased to a temperature of 170° F. (76° C.), available energy is lost and/or wasted where salinous water is returned to the source at a temperature substantially greater than that of the colder sea water. Likewise, the radiant energy absorbed in going from 85° F. to 170° F., a differential of 85° F., or a differential of 105° F. with respect to the colder water, should be utilized virtually 100.0%. The process encompassed by the present invention makes such utilization economically possible.

OBJECTS AND EMBODIMENTS

A principal object of the present invention involves the simultaneous generation of power and the recovery of potable water from a source of salinous water. A corollary objective resides in the utilization of a combination of solar energy with the natural temperature gradients existing at varying depths of the oceans and seas.

Another object is to provide a technique which affords economic enhancement over the use of natural gas or fossil fuels for the generation of power. Another object is directed toward increasing the effective degree to which utilization of the radiant solar energy, absorbed in the solar radiation heat sink, is utilized in conjunction with the available ocean thermal gradient.

A specific object of my invention involves providing a technique for preheating the salinous surface water prior to introducing the same into the solar radiation heat sink, thereby considerably reducing the size of the heat sink required to satisfy process design.

Therefore, in one embodiment, my invention is directed toward a process for simultaneously generating power and recovering potable water from a source of salinous water, which process comprises the sequential steps of: (a) increasing the temperature of a first salinous water portion, obtained from a first depth proximate to the surface of said source, via indirect contact with a vaporous phase which is (i) derived from said first salinous water portion and, (ii) obtained at an elevated temperature; (b) introducing said first salinous water portion into a solar radiation heat sink; (c) exposing said first salinous water portion, within said solar radiation heat sink, to radiant solar energy for a time sufficient to further increase its temperature to a level of at least about 135° F.; (d) introducing the thus-heated first salinous water portion into a first flash separation zone, maintained at a subatmospheric pressure, to provide a substantially non-salinous first vaporous phase and a salinous first liquid phase, and (i) passing said first vaporous phase through a turbine, (ii) generating power from the resulting motion of said turbine and, (iii) condensing the turbine exit vapors, via indirect contact with a second salinous water portion, obtained from a second depth substantially lower than the surface of said source, to recover potable liquid water; (e) introducing said salinous first liquid phase into a second flash separation zone, maintained at a subatmospheric pressure lower than said first flash separation zone, to provide a substantially non-salinous second vaporous phase and a salinous second liquid phase; (f) indirectly contacting said first salinous water portion with said second vaporous phase, to increase the temperature of said first water portion prior to the introduction thereof into said solar radiation heat sink, and recovering additional potable liquid water from said second vaporous phase; (g) introducing said salinous second liquid phase into a third flash separation zone, maintained at a subatmospheric pressure lower than said second flash separation zone, to provide a substantially non-salinous third vaporous phase and a salinous third liquid phase; and, (h) condensing said third vaporous phase, via indirect contact with said second salinous water portion, to recover additional liquid potable water.

This embodiment may be further characterized in that said first flash separation zone is maintained at a subatmospheric pressure in the range of 1.5 psia. (77.6 mm. of Hg.) to about 8.5 psia. (439.6 mm. of Hg.) said second zone at a lower absolute pressure in the range of about 0.75 psia. (38.8 mm. of Hg.) to about 5.5 psig. (57.2 mm. of Hg.) and the third, or last flash separation zone at a lower absolute pressure of from about 0.35 psia. (18.1 mm. of Hg.) to about 0.75 psia. (38.8 mm. of Hg.).

In a more specific and preferred embodiment, the present invention is directed toward a process for simultaneously generating power and recovering potable water from a source of salinous water which comprises the sequential steps of: (a) increasing the temperature of a first salinous water portion, obtained from a first depth proximate to the surface of said source, via indirect contact with a vaporous phase which is (i) derived from said first salinous water portion and, (ii) obtained at an elevated temperature; (b) introducing said first salinous water portion into a solar radiation heat sink, and therein exposing said first water portion to radiant solar energy for a time sufficient to further increase its temperature to a level of at least about 160° F.; (c) introducing the thus-heated first salinous water portion into a first flash separation zone, maintained at subatmospheric pressure, to provide a substantially non-salinous first vaporous phase and a salinous first liquid phase, and passing said first vaporous phase through a first turbine; (d) introducing said first liquid phase into a second flash separation zone, maintained at a subatmospheric pressure lower than said first flash separation zone, to provide a substantially non-salinous second vaporous phase and a salinous second liquid phase, and passing said second vaporous phase through a second turbine; (e) introducing said second liquid phase into a third flash separation zone, maintained at a subatmospheric pressure lower than said second flash separation zone, to provide a substantially non-salinous third vaporous phase and a salinous third liquid phase, and passing said third vaporous phase through a third turbine; (f) generating power from the resulting motion of said first, second and third turbines, and condensing the turbine exit vapors, via indirect contact with a second salinous water portion, obtained from a second depth substantially lower than the surface of said source, to recover potable liquid water; (g) introducing said third liquid phase into a fourth flash separation zone, maintained at a lower subatmospheric pressure than said third flash separation zone, to provide a substantially non-salinous fourth vaporous phase and a fourth liquid phase; (h) indirectly contacting said first salinous water portion with said fourth vaporous phase, to increase the temperature of said first salinous water portion prior to the introduction thereof into said solar radiation heat sink, and recovering additional potable liquid water from said fourth vaporous phase; (i) introducing said fourth liquid phase into a fifth flash separation zone, maintained at a subatmospheric pressure lower than said fourth flash separation zone, to provide a substantially non-salinous fifth vaporous phase and a salinous fifth liquid phase; and, (j) condensing said fifth vaporous phase, via indirect contact with said second salinous water portion, to recover additional liquid potable water.

These, as well as other objects and embodiments will become evident to those possessing the requisite skill in the appropriate art, from the following detailed description of the present invention. In one such other embodiment, the first flash zone is maintained at a subatmospheric pressure in the range of about 2.5 psia. (129.3 mm. of Hg.) to about 8.5 psia., (439.6 mm. of Hg.), the second zone at a lower absolute pressure in the range of from 1.5 psia. (77.6 mm. of Hg.) to about 5.5 psia. (284.4 mm. of Hg.), the third zone at a lower absolute pressure of about 0.9 psia. (46.5 mm. of Hg.) to about 3.5 psia. (181 mm. of Hg.), the fourth flash zone at a pressure of about 0.6 psia (31.1 mm. of Hg.) to about 2.5 psia. (129.3 mm. of Hg.), and the fifth flash zone at a lower absolute pressure of about 0.35 psia (18.1 mm. of Hg.) to about 0.75 psia. (38.8 mm. of Hg.).

PRIOR ART

It would appear that the greater proportion of available prior art consists of articles published in the various trade and scientific journals. Two examples of these will be discussed hereinbelow. With respect to issued patents, these appear to be principally directed toward various devices capable of utilizing radiant solar energy for (1) heating homes and other structures, and, (2) the desalination of non-potable water. For example, respecting the latter, U.S. Pat. No. 2,803,591 issued Aug. 20, 1957, directs itself to a form of solar still for the purification of undrinkable water. This impure water is sprayed into a closed and well-insulated chamber containing hot, dry air which becomes enriched with water vapor. The saturated hot air is withdrawn and cooled, yielding a condensate which is recovered as potable water. The device utilizes a series of mirrors to concentrate the rays of the sun for the purpose of heating the air which is introduced into the spray chamber.

In U.S. Pat. No. 2,813,063, issued Nov. 12, 1957, there is described a solar still having a wick which becomes saturated with salt water. Solar radiation heats the wick and causes evaporation of water. The still is constructed from a semi-rigid, flexible material such as polyethylene which is transparent with respect to solar radiation. A similar solar still, absent the wick, is illustrated in U.S. Pat. No. 2,848,389, issued Aug. 19, 1958.

An article entitled "Efforts to Tap Ocean Thermal Energy Gain," *Chemical and Engineering News*, Feb. 9, 1976, pp. 19–20, in part discusses the use of available ocean thermal gradients. In one particular system, a working fluid such as propane or ammonia is employed in a closed Rankine cycle. Warm surface water passes through a heat exchanger-evaporator, causing vaporization of the working fluid. The vapor then is expanded in a turbine to generate electric power. From the turbine, the vapor passes to a heat exchanger-condenser, where it is cooled and condensed by cold deep ocean water, and recycled to the heat exchanger-evaporator. Since the maximum differential temperature between surface water and deep water is not appreciably greater than 40° F., this technique suffers from an extremely low thermodynamic cycle efficiency, and is, therefore, very impractical on a commercial scale.

Of further interest is an article entitled "Desalination of Sea Water Using Solar Radiation Under Retarded Evaporation Conditions," *Industrial Engineering Chemistry, Process Design Development*, Volume 14, No. 4, 1975, pp. 351–358. Described is a desalination process which primarily uses the temperature difference between the surface sea water and the deep sea water. A shallow pond, swamp area, or a large heating flat is proposed for use as a radiant energy sink. Water, from the surface, is pumped into the pond where it is heated by solar radiation. An insoluble monolayer, or a thin, transparent plastic sheet on the water surface is used to suppress evaporative heat loss from the water layer. The heated water is fed into a heat exchanger which is a vacuum chamber. The warm sea water partly flash evaporates while it runs down a packed section. The vapor condenses in an adjoining section over cooling coils being supplied with cold deep sea water, which cooling water is returned to the sea. Noted is the fact that there is no provision for the simultaneous generation of power from the flashed vapors.

U.S. Pat. No. 3,928,145 issued Dec. 23, 1975, is specifically referred to in an article entitled "Power, Fresh Water and Food from the Sea," *Mechanical Engineering*, September, 1976, pp. 27–34. All of the subject matter which appears in the article can be found in the issued patent, the latter actually being more inclusive. Therefore, the discussion which follows will be specifically directed toward the pertinency of the issued patent, from which the present invention can be readily distinguished. As initially described, in general terms, combined use is made of solar radiation and the thermal gradients existing between surface and deep sea water. Warm surface water, from tropic seas, is increased in temperature through the use of a solar heater; the heated sea water is flash evaporated, or boiled at subatmospheric pressure. Sensible heat of the water leaves as vaporous heat, and the steam formed, as the sea water cools, expands to a lower pressure in a turbine, or other steam engine which drives a generator. The exit vapors are passed into a condenser wherein they are condensed via indirect heat-exchange with cold water from the depths of the sea. As an integral part of the process, the heated sea water from the condenser is introduced into a mariculture system which produces at least one specie of food fish; water from the mariculture operation is passed into the solar heater and therefrom into the flash boiler, the discharge water from which is returned to the sea.

Briefly referring to the accompanying drawing, FIG. 1 is believed to be fairly representative of the foregoing, with the exception of the mariculture system which forms no part of the process herein described. It is quite clear that there is no recognition of multiple flash separation zones for the generation of power and simultaneous recovery of potable water. While a so-called multiple flash evaporator is described, it is discussed as being intended solely for maximizing fresh water recovery without power generation. As stated in this reference, surface sea water is available at 86° F. (30° C.), and may be increased in temperature to 95° F. (35° C.) by admixing therewith the warm water effluent from mariculture pools, or to 175° F. (78.8° C.) by flowing ponds having black bottoms and transparent covers. When utilizing a single flash evaporation zone to generate power and recover potable water, the sea water becomes cooled to a temperature of 77° F. (25° C.); at this temperature, the subatmospheric pressure within the flash evaporator is 0.46 psia. (23.8 mm. of Hg.). The resulting vaporous phase is passed through a turbine, and the exit vapors condensed to 59° F. (15° C.) using cold sea water which is available at a temperature of 41° F. (5° C.), the latter (following condensation) increases in temperature to 50° F. (10° C.). The resulting flash evaporated liquid phase, at 77° F. (25° C.), is directly returned to the source of the sea water. In so doing, the disclosed process effectively wastes the available 18° F. (10° C.) temperature differential between 59° F. (15° C.) and 77° F. (25° C.), by not contemplating a second flash evaporation of the 77° F. (25° C.) liquid phase to 59° F. (15° C.) which would be effected at a subatmospheric pressure of about 0.25 psia. (12.9 mm. of Hg.). In effect, there exists a waste of about 18 BTU/lb. of water returned to the sea at 77° F.

By way of further illustration, the present invention, as shown in the accompanying FIG. 2, will be compared to that of the prior art exemplified by U.S. Pat. No. 3,928,145, described above and fairly illustrated in accompanying FIG. 1. In so doing, the variables of the reference will be used; that is, surface water at 86° F. (30° C.), heated surface water at 175° F. (78.8° C.) and colder, deeper sea water at 41° F. (5.0° C.). A charge rate of 4.72 MM lb/hr. (2.15 MM kg/hr.) of salinous water will be employed as the basis for comparison. As above stated, the reference uses a single flash zone to reduce the 175° F. (78.8° C.) water to 77° F. (25° C.); the subatmospheric single flash is, therefore, at a pressure of about 0.46 psia. (23.8 mm. of Hg.). This provides 462,560 lb/hr. (210,255 kg/hr.) of vapors, with the 77° F. (25° C.) liquid phase being returned to the sea. After passing through the turbine, the vapors are condensed to 59° F. (15° C.); the downstream side of the turbine is, therefore at a subatmospheric pressure of about 0.25 psia. (12.9 mm. of Hg.). As a general proposition, the work developed in the turbine is proportional to the ratio of the pressures across the turbine; that is, the ratio of the pressure of the vapors introduced into the turbine to the pressure of the vapors exiting therefrom. The disclosed procedure has an effective pressure ratio of 0.46/0.25, or about 1.84:1.0, and will generate about 6,543 HP-hrs. of power. Water, from the turbine exit vapors condensed to 59° F., is recovered in an amount of about 1,261,636 gal/day (1,050,526 Imp. gal/day).

In accordance with the present invention, for example, the power flash will be effected to reduce the 175°

F. (78.8° C.) water to 136° F. (57.3° C.), or at a subatmospheric pressure of about 2.60 psia. (134.5 mm. of Hg.), to result in 184,100 lb/hr. (83,682 kg/hr.) of non-salinous vapors which pass through the turbine, and condense to a temperature of 59° F. (15° C.), or 0.25 psia. (12.9 mm. of Hg.). The pressure ratio across the turbine is 2.60/0.25, or 10.4:1.0, and about 10,273 HP-hrs. of power is generated. The liquid phase is subjected to a second flash, for example, to a temperature of 116° F. (46.3° C.), at 1.51 psia. (78.1 mm. of Hg.) to provide an additional 90,700 lb/hr. (41,227 kg/hr.) of vapors which, at 116° F. (46.3° C.), are used to increase the temperature of the 86° F. (30° C.) surface water to about 106° F. (41.1° C.), via indirect heat-exchange. Obviously, the thus-heated surface water will require a much smaller solar radiation heat sink to raise the temperature to 175° F. (78.8° C.). As above stated, the reference does not contemplate a final flash — e.g. to 59° F. (15° C.) — to recover additional water. When this is, however, in the present process, effected at 0.25 psia. (12.9 mm. of Hg.), an additional 253,400 lb/hr. (115,182 kg/hr.) of non-salinous vapors are produced. From the resulting three vaporous phases, the present technique recovers a total of about 1,440,545 gal/day (1,199,499 Imp. gal/day) of potable water.

As above stated, the reference process contemplates multiple flash stages only to increase water recovery at the expense of not producing any power; it is, therefore, concerned solely with multiple condensation stages. The quantity of power generated falls short of the maximum available by not employing a plurality of power flash zones. As hereinafter indicated in a specific illustration, the present invention will raise 85° F. (29.4° C.) surface water to a temperature of about 105° F. (40.6° C.) for subsequent introduction into the solar radiation heat sink, and produce about 2.45 HP-hrs. per 1,000 lb/hr. of salinous water charged, using a single power flash zone. When employing a series of three power flash zones, power is generated in an amount of about 3.11 HP-hrs. per 1,000 lb/hr. of salinous water charged to the system.

SUMMARY OF INVENTION

The present invention offers a feasible process which is capable of currently being commercially acceptable. With respect to the technology demand imposed upon an installation of given capacity, there is afforded great flexibility with respect to the relative amount of generated power and the quantity of potable water recovered. That is, a commercial unit, employing a solar radiation heat sink of a given size (generally determined by the incidence of solar energy, or the available insolation, and the efficiency of the solar radiation heat sink), can be readily designed to vary the relative quantities of generated power, depending upon the load demand, and the amount of potable water recovery, which decreases somewhat as the generated power increases. Preferably, the power flash system comprises a plurality of vacuum flash zones functioning at succeedingly lower absolute pressures, with the liquid phases passing through the system in series flow. Each of the resulting substantially non-salinous vaporous phases passes through a separate turbine, or into and through different stages of a multiple-stage turbine, from the exit vapors of which potable water is recovered. As hereinafter illustrated, at the same temperature differential across the power flash system, three flash zones (as would two zones) generate more power than one zone, four zones more than three, etc. The precise number will depend upon the load demand and the particular economic situation then existing. At least one subsequent flash zone is used to provide another vaporous phase which is used to increase the surface water temperature prior to the introduction thereof into the solar radiation heat sink. In those locales where the amount of power generation is not as critical as the quantity of potable water, a plurality of vacuum flash zones may be employed in the surface water preheat system. The resulting vaporous phases are employed in reverse consecutive order in the preheating system. As previously stated, one last flash separation is effected to a temperature not more than 15° F. (8.3° C.) higher than the colder, deeper water from the source. Thus, where 70° F. (21.1° C.) water is available from the source, the final flash should be effected at a temperature not substantially above about 85° F. (29.4° C.).

As hereinbefore stated, the present process involves the combinative utilization of ocean thermal gradients and solar radiation for the simultaneous generation of power and the recovery of potable water. Where a sufficient thermal gradient, at least about 15° F. (8.3° C.), is not available, certain modifications can be made to achieve the desired end result of power generation accompanied by potable water recovery. However, where temperature differentials of about 15° F. (8.3° C.) to about 40° F. (22.4° C.) do exist (the latter generally considered the practical maximum available), the present technique affords enhancement in overall efficiency, especially at the higher temperature gradients.

Initially, surface water is increased in temperature — e.g. from about 85° F. (29.4° C.) to about 105° F. (40.6° C.) — via indirect heat-exchange with a non-salinous vaporous phase derived therefrom at subatmospheric pressure and an elevated temperature. The heated surface water is next introduced into a solar radiation heat sink, the exact dimensions of which are primarily dependent upon the available insolation. Insolation may be conveniently expressed as the quantity of B.T.U.'s, from the sun, falling upon a square foot of heat sink surface per day, or the incidence of solar energy. Solar radiation heat sinks may take the form of flat plate collectors, or, in the interests of capital investment enhancement, a shallow solar pond. The latter constitutes an economical device for capturing a portion of the insolation falling upon it from the sun, whenever only moderate temperatures of the heated water are required. The heated surface sea water is pumped into the solar radiation heat sink to a depth which varies seasonally, much the same as the insolation from the sun varies seasonally. Depending upon the season, as well as the desired temperature of the heated water, a solar pond depth in the range of about 1 to about 10 inches is acceptable, although a depth from 2 to about 8 inches appears to be the most practical. The length and width of the solar pond are generally determined by the terrain and climate which are peculiar to the locale off the unit. The temperature to which the water in the solar pond is heated, prior to being charged to the process, depends upon the relative quantities of potable water and generated power which the selected installation is designed to deliver. For example, a solar pond receiving insolation in the amount of 3,000 BTU/sq.ft./day, and functioning at an efficiency of about 60.0%, would heat a three-inch depth of water from a temperature of about 85° F. (29.4° C.) up to about 200° F. (93° C.) during a period of approximately 10 daylight hours. Where the 85° F. (29.4° C.)

water is first preheated to a temperature of about 105° F. (40.6° C.), in accordance with my invention, the size of the pond could be decreased by about 15.0% to about 20.0%. Solar pond efficiency is determined by a comparison of its absorptivity with the total insolation available, and should be such that the sea water attains a temperature level of at least about 135° F. (56.8° C.).

In order to increase the efficiency of the solar pond, evaporative heat loss therefrom is inhibited through the use of a covering. Suitable coverings are those which are transparent to solar radiation, while simultaneously being opaque to long wave radiation. Additionally, a suitable covering will provide an insulating effect between the water being heated and the atmosphere, such that conductive and convective heat loss is minimized. For example, one such suitable covering would be hollow glass balls, or beads having a nominal diameter of about ¼ inch to about ½ inch, disposed in a layer from about ¼ inch to about 2 inches thick. A relatively thin (4 to about 6 mils) sheet of polyvinyl chloride can be suitably employed, as can two such sheets which are uniformly tacked to provide a multitude of air bubbles having a minimum air gap of about 1 inch. The plastic sheet can be used in combination with an underlayer of acrylic, fiberglass, polyvinyl carbonate, or other plastic which is opaque to long wave radiation, and which is formed into a modified sine wave having sharp or curved angles of about 45° to about 75°. Other suitable coverings include glass wool which is reinforced with plastic, opaque to long wave radiation, in combination with a tacked polyvinyl chloride sheet; a mat of fused polyvinyl chloride bubbles, about one to two inches thick; and, a combination of polyvinyl chloride-coated fiberglass to which the polyvinyl sheet is uniformly tacked.

Also of importance, with respect to the efficiency of the solar pond, is the insulation of the sides and bottom thereof. Several techniques to accomplish this will become evident to those possessing the requisite skill in the appropriate art. For instance, the solar pond can be lined with a thin, black sheet of polymeric material, such as polyethylene, polyvinyl chloride, polyvinyl carbonate, etc., disposed over a layer of dry sand, crushed shells, etc. A variety of commercially available insulating material, such as styrofoam, vermiculite, etc., can be used as the lining over which the black sheet of polymeric material is placed. Insulating material can be foamed on and thus become integral with the polymeric sheet, or the polymeric material can be impregnated with an inorganic substance having a high absorptivity/emissivity ratio; this may be copper oxide, nickel oxide, black nickel, etc.

Following the prescribed period of exposure to solar radiation, during which the temperature of the surface sea water in the pond is increased to a level of at least about 135° F. (56.8° C.), and at such time as the water has reached its maximum temperature for the day, the heated salinous water is drained into a hot water storage pond, or sump. Similarly, the preheated surface water is introduced into a storage pond, or sump, capable of storing a 24-hour supply, and introduced therefrom into the solar pond. The size of the sump depends upon the design capacity of the unit; however, it should be capable of storing at least a 24-hour supply of the heated salinous water. To reduce the loss of energy from the surface of the sump, it is preferred that the depth thereof be significantly greater than its length and width. Furthermore, the storage pond should be covered and lined much the same as the solar pond.

In further describing my invention, it will be assumed that surface sea water is available at a temperature of about 85° F. (29.4° C.) and that the sea water temperature about 450 feet below the surface is approximately 70° F. (21.1° C.). Also, that insolation from the sun, at the period of the year being considered, is about 3000 BTU/sq.ft./day, and that a reasonably efficient (about 50.0%) solar pond is being employed as the solar radiation heat sink. The solar pond will be one which covers about 160 to about 170 acres and has a depth of about three inches; during approximately 10 daylight hours, this pond will heat 113 MM lbs. (51.36 MM kg.) of surface water from its preheated temperature of about 105° F. (40.6° C.) to about 200° F. (93° C.). Absent the preheating technique of the present invention, a solar pond covering about 200 acres, and having a depth of about 2½ inches, would be required to raise the 85° F. (29.4° C.) surface water to a temperature of 200° F. (93° C.). Since the solar pond, or flat-plate collector, represents an unusually large proportion of the capital expenditure for the entire installation, any reduction in its area affords significant economic advantages. The preheated surface water is introduced into a storage pond, or sump, which will be sized for at least a capacity equal to the quantity of sea water charged to the unit over a 24-hour operational period. Likewise, the storage pond into which the heated water from the solar radiation heat sink is introduced, is sized to accommodate the 24-hour capacity of the installation.

As hereinbefore stated, the basic prior art processing technique involves charging the heated salinous water into a flash separation zone which is maintained under subatmospheric pressure. This provides a non-salinous vaporous phase, which is passed through a turbine, and a salinous liquid phase which is returned to the source of the sea water. In accordance with my invention, the flash separation zone preferably consists of multiple power flashes in a plurality of vacuum flash zones, functioning in series with respect to the salinous liquid phase, each succeeding one of which is maintained at a lower subatmospheric pressure. This increases both the overall efficiency of the process and the quantity of generated power, albeit accompanied by some decrease in the amount of potable water which is recovered. To illustrate, brief reference will be made to accompanying FIGS. 2 and 3. The former illustrates the basic concept where (1) and intermediate flash to 120° F. (49° C.), at an absolute pressure of 1.69 psi. (87.4 mm. of Hg.) provides a vaporous phase which is used to preheat the 85° F. (29.4° C.) surface water and, (2) a final flash of the condensed vapors is effected to 75° F. (23.9° C.), at an absolute pressure of 0.43 psi. (22.2 mm. of Hg.). FIG. 3 is similar with the exception that the power flash system comprises three flash zones at 180° F. (83° C.), an absolute pressure of 7.51 psi. (388.4 mm. og Hg.), 160° F. (71° C.), an absolute pressure of 4.74 psi. (245.1 mm. of Hg.) and 140° F. (60° C.), an absolute pressure of 2.89 psi. (149.5 mm. of Hg.). This, in contrast to the single power flash zone where the 200° F. (93° C.) solar pond water is flashed to 140° F. (60° C.). The single power flash system produces about 12,686 HP-hrs. of generated power and recovers 1,641,205 gal/day (1,366,582 Imp. gal/day) of potable water. In the multiple-flash power system, 1,625,928 gal/day (1,353,861 Imp. gal/day) of potable water is recovered and 15,681 HP-hrs. of power is generated. In both cases, through the use of the intermediate flash zone, the temperature of the surface water is increased from 85° F. (29.4° C.) to about 105° F. (40.6° C.) prior to its introduction into the solar radiation pond. In the absence of this preheating technique, an approximate 175-acre solar pond would necessarily be increased to about 200 acres.

When a single power flash zone is utilized, it will be maintained at a subatmospheric pressure of about 1.5 psia. (77.6 mm. of Hg.) to about 8.5 psia. (439.6 mm. of Hg.). The intermediate vacuum flash zone will be at a lower subatmospheric pressure of about 0.75 psia. (38.8 mm. of Hg.) to about 5.5 psia. (284.4 mm. of Hg.), and the final flash zone at a lower absolute pressure of about 0.35 pisa. (18.1 mm. of Hg.) to about 0.75 psia. (38.9 mm. of Hg.). In a multiple-stage power flash system having, for example, three individual zones, the first will function at a subatmospheric pressure of about 2.5 psia. (129.3 mm. of Hg.) to about 8.5 psia. (439.6 mm. of Hg.), the second at a lower absolute pressure of 1.5 psia. (77.6 mm. of Hg.) to about 5.5 psia. (284.4 mm. of Hg.) and the third at a lower absolute pressure in the range of about 0.9 psia. (46.5 mm. of Hg.) to about 3.5 psia. (181 mm. of Hg.). The flash zone used to provide the surface water preheat vaporous phase will be maintained at a lower absolute pressure in the range of about 0.6 psia. (31 mm. of Hg.) to about 2.5 psia. (129.3 mm. of Hg.), while the last flash zone will be at a lower absolute pressure of 0.35 psia. (18.1 mm. of Hg.) to about 0.75 psia. (38.8 mm. of Hg.).

The foregoing discussion describes a process wherein the power flash is effected in a series of individual vacuum flash zones, with the last salinous liquid phase being flashed to the lowest obtainable subatmospheric pressure to lower the temperature to a level not more than 15° F. higher than the colder sea water, and to recover additional non-salinous vapors. Certain modifications can be made to this basic system for the purpose of further increasing the quantity of generated power. In one such modification, the salinous liquid phase from the flash zone used to provide surface water preheat vapors, is utilized as the heat-exchanged medium to vaporize a light hydrocarbon. The hydrocarbon vapors are passed through a separate turbine for additional power generation. The cooled liquid phase is subjected to a final flash for additional potable water recovery. In another such modification, the liquid phase from the vacuum flash zone, supplying preheat vapors, is employed as the heat-exchange medium to partially vaporize a light hydrocarbon. The partially vaporized hydrocarbon is then further vaporized by heat-exchange with the individual non-salinous vapor phases from the multiple-flash power system. The vaporized hydrocarbon streams are passed through multiple turbine stages from the motion of which the power is generated. The somewhat cooled non-salinous vapor phases are combined and condensed to recover liquid potable water. Other such modifications can be made, virtually all of which will be dependent upon the desired quantities of generated power and recovered potable water, as well as the relative economics involved with capital expenditures.

BRIEF DESCRIPTION OF DRAWINGS

In additionally describing my invention, reference will be made to the accompanying drawing which illustrates several embodiments thereof. These are presented by way of a simplified, schematic flow diagram in which details such as pumps, instrumentation and controls, valving, start-up lines and similar hardware have been eliminated on the grounds of being non-essential to a clear understanding of the techniques involved. The utilization of these miscellaneous appurtenances, to modify the illustrated process, is well within the purview of one skilled in the appropriate art, and the use thereof will not create a departure from the scope and the spirit of the appended claims.

FIG. 1 is intended to be representative of the prior art as exemplified by U.S. Pat. No. 3,928,145 hereinbefore described and discussed in detail.

FIG. 2 is illustrative of one embodiment of my invention where a single power flash zone 9 is used in conjunction with a surface water preheat vapor zone 25 and a final water-recovery flash zone 27.

DETAILED DESCRIPTION OF DRAWINGS

Figure 3:
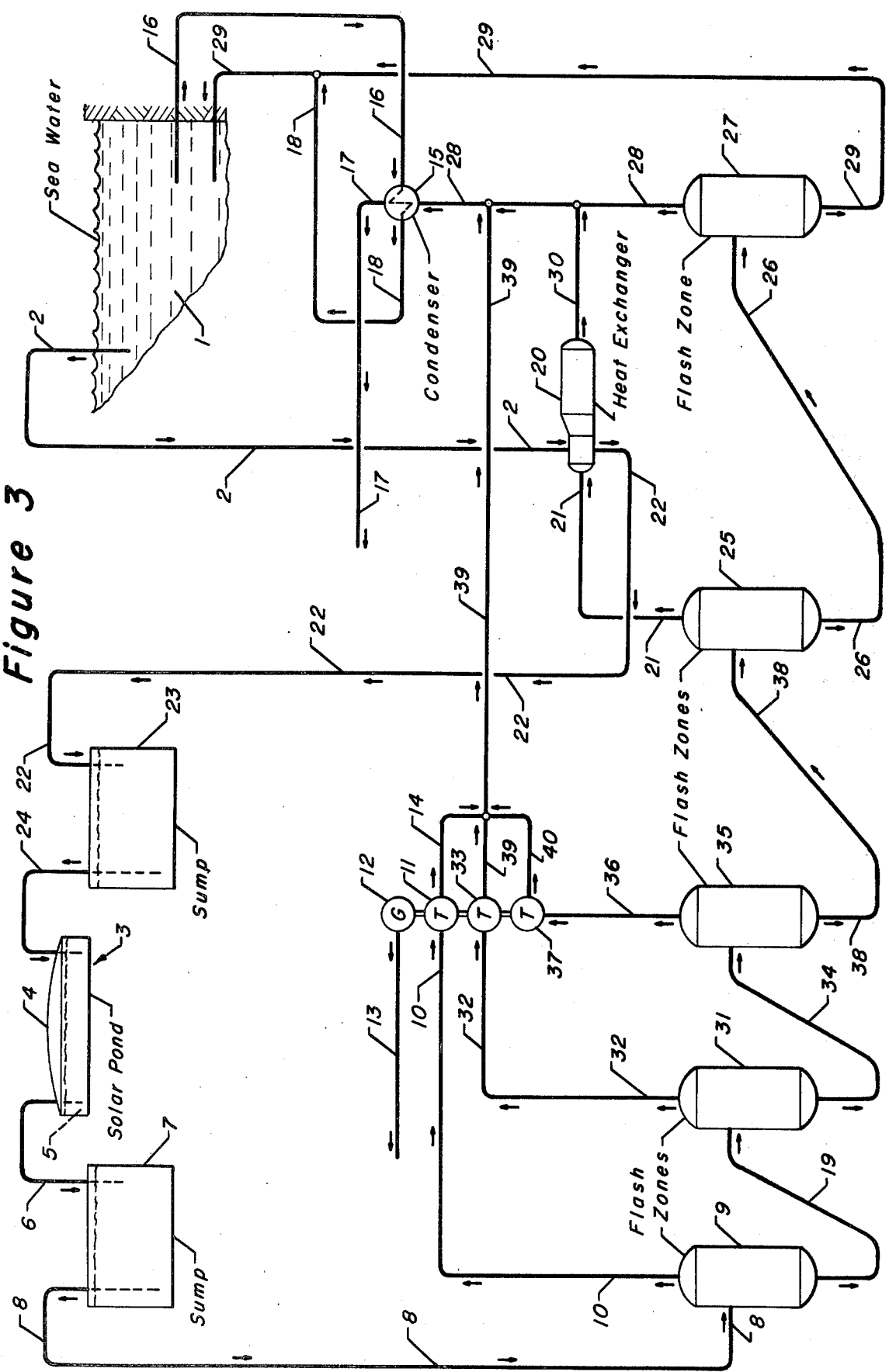
FIG. 3 is presented to show the embodiment where the power flash system comprises a plurality of vacuum flash zones; in the drawing, three are illustrated as flash zones 9, 31 and 35. The vaporous phases therefrom are respectively passed through turbines 11, 33 and 37, which may function in tandem, or exist as different stages of a multiple-stage turbine.

In describing the three FIGURES, the basis will be a charge rate of 4.72 MM lb/hr. (2.15 MM kg/hr.) of surface sea water at a temperature of about 85° F. (29.4° C.), with a solar pond capable of increasing the temperature to a level of about 200° F. (93° C.). With respect to FIG. 1, illustrative of the prior art, the colder, deeper sea water will be obtained at a temperature of 41° F. (5° C.); FIGS. 2 and 3 will be described with colder sea water obtained at a temperature of about 70° F. (21.1° C.).

With specific reference now to FIG. 1, surface sea water at a temperature of 85° F. (29.4° C.), from a source 1, is introduced via line 2 into solar pond 3. The solar pond, having a covering 4 (as previously described), is sized to absorb 1,500 BTU/sq.ft./day of solar energy, and 113 MM lb. (51.36 1 MM kg.) per 24-hour day of salinous water. The heated water 5, at a temperature of about 200° F. (93° C.), is introduced, via line 6, into sump 7, from which it is passed into flash separation zone 9 by way of line 8. The rate of salinous water entering zone 9 is about 4.72 MM lb/hr. (2.15 MM kg/hr.), and the zone functions at a subatmospheric pressure of about 0.46 psia. (23.8 mm. of Hg.). The flashed vaporous phase, in an amount of about 580,600 lb/hr. (263,909 kg/hr.), at a temperature of 77° F. (25° C.), passes via conduit 10 into and through turbine 11, the resulting motion of which generates 6,846 HP-hrs. of power via generator 12 and line 13. The vapors then pass through line 14 into condenser 15 wherein they are cooled and/or condensed via indirect contact with 41° F. (5° C.) sea water obtained from source 1 via conduit 16. Potable water is recovered, in an amount of about 1,678,795 gal/day (1.40 MM Imp. gal/day), by way of line 17, and the cooled sea water, at about 50° F. (10° C.), is returned to source 1 through line 18. The liquid phase from flash zone 9, in the amount of about 4.14 MM lb/hr. (1.88 MM kg/hr.), is returned to source 1, via line 19, at a temperature of 77° F. (25° C.). As hereinbefore stated, additional potable water could be recovered if the 77° F. (25° C.) liquid phase were to be flashed to 59° F. (15° C.).

FIG. 2 illustrates one embodiment of my invention wherein surface water at 85° F. (29.4° C.) passes via line 2 into heat-exchanger 20, for indirect contact therein with 88,700 lb/hr. (40,318 kg/hr.) of a vaporous phase, at a temperature of 120° F. (49° C.), the source of which is hereinafter described. The heated surface water, in an amount of 4.72 MM lb/hr. (2.15 MM kg/hr.) and at a temperature of about 104.5° F. (40.2° C.), is introduced, via line 22, into storage pond 23, from with it flows into solar pond 3 by way of conduit 24. Heated water 5 from solar pond 3 (having a suitable covering 4), passes by way of line 6, at a temperature of 200° F. (93° C.) into a second storage pond, or sump 7.

The thus-heated surface water is introduced, via line 8, into vacuum flash zone 9 which is maintained at a subatmospheric pressure of about 2.89 psia. (149.5 mm. of Hg.). A non-salinous vaporous phase, at a temperature of about 140° F. (60° C.) and in the amount of 283,200 lb/hr. (128,727 kg/hr.) passes through line 10 into and through turbine 11, the downstream side of which is at a subatmospheric pressure of about 0.43 psia. (22.2 mm. of Hg.). From the resulting motion of turbine 11, 12,686 HP-hrs. of power is generated via generator 12 and conduit 13. The exiting vapors in line 14 are passed thereby into condenser 15 wherein they are cooled and/or condensed via indirect heat-exchange with cold sea water at a temperature of 70° F. (21.1° C.) from line 16. The condensate is recovered as potable water through conduit 17.

The 140° F. (60° C.) salinous liquid phase from flash zone 9 is introduced, via line 19, into vacuum flash separation zone 25 which is maintained at a subatmospheric pressure of about 1.69 psia. (87.4 mm. of Hg.). The resulting non-salinous vaporous phase in line 21, at a temperature of about 120° F. (49° C.) and in the amount of 88,700 lb/hr. (40,318 kg/hr.), is introduced into heat-exchanger 20 and therein raises the temperature of the surface water in line 2 to about 104.5° F. (40.2° C.). The cooled vapors are recovered as potable water via lines 30 and 17. The 120° F. (49° C.) liquid phase in line 26 (emanating from vacuum flash zone 25) is introduced thereby into vacuum flash zone 27 which is maintained under a pressure of about 0.43 psia. (22.2 1 mm. of Hg.). The 75° F. (23.9° C.) vaporous phase in line 28, in an amount of about 195,700 lb/hr. (88,950 kg/hr.), is conveniently admixed with the turbine exit vapors in line 14, and introduced therewith into condenser 15, ultimately recovered as potable water in line 17. The total amount of potable water recovered is about 567,600 lb/hr. (258,000 kg/hr.), or 1,641,205 gal/day (1,366,582 Imp. gal/day).

A preferred embodiment of my invention, wherein a multiple-stage power flash system is employed, is illustrated in FIG. 3. The salinous surface sea water from source 1 is obtained by conduit 2 and passed thereby into heat-exchanger 20, wherein its temperature is increased from 85° F. (29.4° C.) to a level of about 104.5° F. (40.2° C.). The heated surface water is passed via line 22 into storage pond 23 which is sized for a capacity of about 113 MM lb. (51.36 MM kg.) of water per 24-hour day. From sump 23, the heated surface water is introduced into covered (4) solar pond 3, wherein the temperature is increased to a level of 200° F. (93° C.). Hot surface water 5 is introduced, via line 6 into sump 7, from which it is charged, at a rate of 4.72 MM lb/hr. (2.15 MM kg/hr.), via line 8 into flash separation zone 9. This initial power flash zone is maintained at a subatmospheric pressure of about 7.51 psia. (388.4 mm. of Hg.) to provide vaporous and liquid phases at a temperature of about 180° F. (83° C.).

The vaporous phase, in an amount of about 94,400 lb/hr. (42,910 kg/hr.), is introduced, via line 10, into and through turbine 11, from the resulting motion of which about 6,382 HP-hrs. of power is generated via generator 12 and conduit 13. The salinous liquid phase from flash zone 9, in an amount of about 4.63 MM lb/hr. (2.10 MM kg/hr.), is passed via line 19 into a second vacuum flash zone 31; this flash zone is maintained at a subatmospheric pressure of about 4.74 psia. (245.1 mm. of Hg.) to provide vaporous and liquid phases at a temperature of about 160° F. (71° C.). The vaporous phase is passed via line 32 into and through turbine 33, in an amount of about 92,500 lb/hr. (42,045 kg/hr.), from the resulting motion of which an additional 5,235 HP-hrs. of power is generated via generator 12 and conduit 13.

The salinous liquid phase from flash zone 31, in an amount of about 4.53 MM lb/hr. (2.06 kg/hr.), is introduced via line 34 into a third vacuum flash separation zone 35 which is maintained at a subatmospheric pressure of about 2.89 psia. (149.5 mm. of Hg.), to provide vaporous and liquid phases at a temperature of about 140° F. (60° C.). The vaporous phase, in the amount of 90,700 lb/hr. (41,227 kg/hr.), passes via line 36 into and through turbine 37, from the resulting motion of which an additional 4,064 HP-hrs. of power is generated via generator 12 and conduit 13. Turbines 37, 33 and 11 may be individual and functioning in tandem, or different stages of a multiple-stage turbine; in any event, the total generated power is about 15,681 HP-hrs.

The liquid phase from the last power flash zone 35 is introduced, via line 38, into vacuum flash zone 25, in the amount of about 4.44 MM lb/hr. (2.02 MM kg/hr.). Flash zone 25 functions at a subatmospheric pressure of about 1.69 psia. (87.4 mm. of Hg.) and provides vaporous and liquid phases at a temperature of about 120° F. (49° C.). The vaporous phase, in an amount of about 88,800 lb/hr. (40,364 kg/hr.), passes by way of line 21 into heat-exchanger 20 to function therein as the heating medium to increase the temperature of the surface water, in line 2, from 85° F. (29.4° C.) to about 104.5° F. (40.2° C.). Salinous water, in the amount of about 4.35 MM lb/hr. (1.98 MM kg/hr.), is withdrawn from flash zone 25 through line 26, and introduced thereby into final vacuum flash zone 27. The latter is under a subatmospheric pressure of 0.43 psia. (22.2 mm. of Hg.), which produces vaporous and liquid phases at a temperature of about 75° F. (23.9° C.). It should be noted that this temperature is only 5° F. (2.8° C.) higher than the original 70° F. (21.1° C.) colder sea water. Further, the subatmospheric pressure imposed on this last vacuum flash zone determines the downstream pressure with respect to turbines 37, 33 and 11. To reiterate, the prior art process, starting with 200° F. (93° C.) salinous water and flashing at 77° F. (25° C.) in a single zone, produces about 580,600 lb/hr. (263,910 kg/hr.) of vapor. This passes through the single turbine at a pressure ratio of 0.46/0.25, or 1.84:1.0 to produce 6,846 HP-hrs. of generated power. In contrast, the present system produces three separate vapor phases of 94,400 lb/hr., 92,500 lb/hr. and 90,700 lb/hr. (a total of 277,600 lb/hr.), which pass through turbines having pressure ratios of 7.51/0.43 (17.5:1.0), 4.74/0.43 (11.0:1.0) and 2.89/0.43 (6.7:1.0), resectively. The total generated power is 6,382, plus 5,235, plus 4,064, or 15,681 HP-hrs.

The final salinous liquid phase, emanating from flash zone 27 by way of line 29, in the amount of about 4.16 MM lb/hr. (1.89 MM kg/hr.), is returned thereby to sea water source 1. The final non-salinous vaporous phase in line 28, in the amount of 195,900 lb/hr. (89,045 kg/hr.), is introduced into condenser 15, and recovered as potable water via line 17. Sea water, at a temperature of 70° F. (21.1° C.), withdrawn from sea water source 1 via line 16, is used as the cooling/condensing medium in condenser 15, and retured to source 1 by way of lines 18 and 29. The vaporous phase from vacuum flash zone 25, following its use to raise the surface sea water temperature in heat-exchanger 20, is also introduced into condenser 15 by way of conduits 30 and 28. Exit vapors from turbines 11 and 37, in lines 14 and 40, respectively, may be combined with the exit vapors from turbine 33 in line 39, the mixture being passed therethrough and through line 28 into condenser 15. The total amount of potable water recovered through line 17 is 567,600 lb/hr. (258,000 kg/hr.), or about 1,625,928 gal/day (1,353,862 Imp. gal/day).

The foregoing specification, particularly when read in light of the accompanying drawing, is believed to present a concise definition and a clear understanding of the present invention for the simultaneous generation of power and the recovery of potable water from salinous sea water.

I claim as my invention:

1. A process for simultaneously generating power and recovering potable water from a source of salinous water, which process comprises the sequential steps of:
   (a) increasing the temperature of a first salinous water portion, obtained from a first depth proximate to the surface of said source, via indirect contact with a vaporous phase which is (i) derived from said first salinous water portion and, (ii) obtained at an elevated temperature;
   (b) introducing said first salinous water portion into a solar radiation heat sink;
   (c) exposing said first salinous water portion, within said solar radiation heat sink, to radiant solar energy for a time sufficient to further increase its temperature to a level of at least about 135° F.;
   (d) introducing the thus-heated first salinous water portion into a first flash separation zone, maintained at a subatmospheric pressure, to provide a substantially non-salinous first vaporous phase and a salinous first liquid phase, and (i) passing said first vaporous phase through a turbine, (ii) generating power from the resulting motion of said turbine and, (iii) condensing the turbine exit vapors, via indirect contact with a second salinous water portion, obtained from a second depth substantially lower than the surface of said source, to recover potable liquid water;
   (e) introducing said salinous first liquid phase into a second flash separation zone, maintained at a subatmospheric pressure lower than said first flash separation zone, to provide a substantially non-salinous second vaporous phase and a salinous second liquid phase;
   (f) indirectly contacting said first salinous water portion with said second vaporous phase, to increase the temperature of said first water portion prior to the introduction thereof into said solar radiation heat sink, and recovering additional potable liquid water from said second vaporous phase;
   (g) introducing said salinous second liquid phase into a third flash separation zone, maintained at a subatmospheric pressure lower than said second flash separation zone, to provide a substantially non-salinous third vaporous phase and a salinous third liquid phase; and,
   (h) condensing said third vaporous phase, via indirect contact with said second salinous water portion, to recover additional liquid potable water.

2. The process of claim 1 further characterized in that said third salinous liquid phase is returned to the source of said salinous water.

3. The process of claim 2 further characterized in that the temperature of said third liquid phase, returned to said salinous water source, is not more than 15° F. greater than the temperature of said second salinous water portion.

4. The process of claim 1 further characterized in that said solar radiation heat sink comprises a shallow solar pond.

5. The process of claim 1 further characterized in that said solar radiation heat sink comprises a flat plate collector.

6. A process for simultaneously generating power and recovering potable water from a source of salinous water which comprises the sequential steps of:
   (a) increasing the temperature of a first salinous water portion, obtained from a first depth proximate to the surface of said source, via indirect contact with a vaporous phase which is (i) derived from said first salinous water portion and, (ii) obtained at an elevated temperature;
   (b) introducing said first salinous water portion into a solar radiation heat sink, and therein exposing said first water portion to radiant solar energy for a time sufficient to further increase its temperature to a level of at least about 160° F.;
   (c) introducing the thus-heated first salinous water portion into a first flash separation zone, maintained at subatmospheric pressure, to provide a substantially non-salinous first vaporous phase and a salinous first liquid phase, and passing said first vaporous phase through a first turbine;
   (d) introducing said first liquid phase into a second flash separation zone, maintained at a subatmospheric pressure lower than said first flash separation zone, to provide a substantially non-salinous second vaporous phase and a salinous second liquid phase, and passing said second vaporous phase through a second turbine;
   (e) introducing said second liquid phase into a third flash separation zone, maintained at a subatmospheric pressure lower than said second flash separation zone, to provide a substantially non-salinous third vaporous phase and a salinous third liquid phase, and passing said third vaporous phase through a third turbine;
   (f) generating power from the resulting motion of said first, second and third turbines, and condensing the turbine exit vapors, via indirect contact with a second salinous water portion, obtained from a second depth substantially lower than the surface of said source, to recover potable liquid water;
   (g) introducing said third liquid phase into a fourth flash separation zone, maintained at a lower subatmospheric pressure than said third flash separation zone, to provide a substantially non-salinous fourth vaporous phase and a fourth liquid phase;
   (h) indirectly contacting said first salinous water portion with said fourth vaporous phase, to increase the temperature of said first salinous water portion prior to the introduction thereof into said solar radiation heat sink, and receiving additional potable liquid water from said fourth vaporous phase;

(i) introducing said fourth liquid phase into a fifth flash separation zone, maintained at a subatmospheric pressure lower than said fourth flash separation zone, to provide a substantially non-salinous fifth vaporous phase and a salinous fifth liquid phase; and, (j) condensing said fifth vaporous phase, via indirect contact with said second salinous water portion, to recover additional liquid potable water.

7. The process of claim 6 further characterized in that said fifth liquid phase is returned to the source of said salinous water.

8. The process of claim 7 further characterized in that the temperature of said fifth liquid phase, returned to said salinous water source, is not more than 15° F. greater than the temperature of said second salinous water portion.

9. The process of claim 6 further characterized in that said first, second and third turbines function in tandem.

10. The process of claim 6 further characterized in that said first flash zone is maintained at a subatmospheric pressure in the range of about 2.5 psia. to about 8.5 psia., said second zone at a lower pressure in the range of from 1.5 psia. to about 5.5 psia., said third zone at a lower absolute pressure of about 0.9 psia. to about 3.5 psia., said fourth flash zone at a pressure of about 0.6 psia. to about 2.5 psia., and said fifth flash zone at a lower absolute pressure of about 0.35 psia. to about 0.75 psia.

* * * * *